US006633704B2

(12) United States Patent
Kohnke et al.

(10) Patent No.: US 6,633,704 B2
(45) Date of Patent: Oct. 14, 2003

(54) CHROMATIC DISPERSION COMPENSATOR

(75) Inventors: Glenn E. Kohnke, Painted Post, NY (US); Daniel M. Boland, Pomfret Ctr., CT (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/942,286

(22) Filed: Aug. 29, 2001

(65) Prior Publication Data

US 2002/0159699 A1 Oct. 31, 2002

Related U.S. Application Data

(60) Provisional application No. 60/287,439, filed on Apr. 30, 2001.

(51) Int. Cl.[7] .............................................. G02B 6/26
(52) U.S. Cl. .............................. 385/39; 385/24; 385/37
(58) Field of Search .............................. 385/24, 39, 37, 385/15

(56) References Cited

U.S. PATENT DOCUMENTS

| 5,450,427 | A |   | 9/1995 | Fermann et al. ............... 372/18 |
| 5,600,738 | A |   | 2/1997 | Bergland et al. ............... 385/11 |
| 5,920,413 | A | * | 7/1999 | Miyakawa et al. .......... 359/122 |
| 6,271,952 | B1 |   | 8/2001 | Epworth ..................... 359/161 |
| 6,388,785 | B2 | * | 5/2002 | Havstad et al. ............. 359/130 |
| 6,400,869 | B2 | * | 6/2002 | Pan et al. ..................... 385/10 |

FOREIGN PATENT DOCUMENTS

| EP | 0 984 306 A1 | 8/2000 |
| WO | WO 98/08121 | 2/1998 |

OTHER PUBLICATIONS

Polarisation Mode Dispersion in Chirped Fibre Gratings M. Schiano, et al ECOC '98, Sep. 20–24, 1998, Madrid Spain.
Polarisation mode dispersion analysis in fibre chromatic dispersion compensators, I. Riant, et al. Alcatel Corporate Research Center TuS2–1/269.
Polarisation mode dispersion compensation of chirped Bragg gratings used is chromatic dispersion compensators Electronics Letters 17 Feb. 200 vol. 36 No. 4.

* cited by examiner

*Primary Examiner*—Hung N. Ngo
(74) *Attorney, Agent, or Firm*—Eric M. Smith; Svetlana Z Short

(57) ABSTRACT

The present invention is a chromatic dispersion compensator. The chromatic dispersion compensator includes a first 3-port optical circulator, a first grating coupled to the second optical port of the first 3-port optical circulator. A polarization controller is coupled to the third optical port of the first 3-port optical circulator. The chromatic dispersion compensator further includes a second 3-port optical circulator, the polarization controller is coupled to the first optical port of the second 3-port optical circulator and a second grating is coupled to the second optical port of the second 3-port optical circulator.

17 Claims, 2 Drawing Sheets

CHROMATIC DISPERSION COMPENSATOR

CROSS REFERENCE TO RELATED APPLICATION

This application claims the benefit of United States Provisional Application No. 60/287,439 filed Apr. 30, 2001.

BACKGROUND OF THE INVENTION

1. Field of the Invention

The present invention relates generally to chromatic dispersion compensation, and particularly to polarization mode dispersion compensation for chirped fiber gratings.

2. Technical Background

One problem associated with upgrading the channel capacity of optical communication systems is compensating the dispersion of the optical signals. In order to increase the capacity of optical communication systems it is necessary to cancel the accumulated dispersion over the entire operational wavelength range. Thus, accurate control of dispersion control is required. Typically, optical communication systems will require dispersion control of less than 100 picoseconds per nanometer and potentially as low as 20 picoseconds per nanometer. Dispersion may be expressed as the variation in group delay, $\tau$, with respect to wavelength $\lambda$ or $D(\lambda)=d\tau/d\lambda$. Alternately, dispersion may be expressed mathematically as:

$$D(\lambda)=D(\lambda_c)+D'(\lambda_c)(\lambda-\lambda_c) \quad (1)$$

where, $D(\lambda_c)$ is the dispersion (second order); and $D'(\lambda_c)$ is the dispersion slope (third order) or S.

One approach to dispersion compensation in optical communication systems is to intersperse sections of dispersion compensating optical waveguide fiber between segments of transmission of optical fiber. Some factors that influence the performance and design of dispersion compensation modules include; changing traffic patterns, variations in the optical power of the optical signals, temperature fluctuations along the length of the optical fiber waveguides, installation effects on the cable, modulation format, channel spacing and irregularities with the optical waveguide fiber. Because the magnitude of dispersion in optical communication systems may change, dispersion compensation using dispersion compensating fiber will not be optimal for every channel and a tunable dispersion compensation is required.

Dispersion may be compensated for dynamically during the operation of the optical communication system in order to minimize time-dependent effects such as, for example, the variation in the dispersion characteristics of optical waveguide fibers resulting from fluctuations in temperature.

One proposed approach for dispersion compensation uses fiber Bragg gratings as tunable dispersion compensators for a single channel. In one proposed configuration, a single non-linearly chirped fiber Bragg grating is strained to vary the dispersion within the band of wavelengths of interest. Another proposed configuration uses temperature to shift the wavelength of the entire dispersion curve. This approach to dispersion compensation introduces some amount of dispersion slope across the passband. The thermally tuned configuration dynamically alters the amount of chirp along the length of the grating. The thermally tuned configurations proposed thus far require complex tuning mechanisms to control the dispersion compensation as well as requiring a second tuning mechanism to maintain a constant grating center wavelength. Thus there is a need for a less complex, tunable dispersion compensator for optical communication systems.

Polarization mode dispersion is the maximum difference of group delay as a function of polarization for an optical component. For optical components, polarization mode dispersion is a deterministic quantity and is the difference in group delay between the two principal states of polarization. In the case of linearly chirped fiber Bragg gratings group delay is a linear function of wavelength and the polarization mode dispersion is simply related to the birefringence of the fiber in the grating region by:

$$PMD=|CD|\times\Delta\lambda_B \quad (2)$$

where

PMD is the polarization mode dispersion;

CD is the chromatic dispersion; and $\Delta\lambda_B$ is the Bragg wavelength shift.

Equation (2) may also be written as:

$$PMD=|CD|\times 2\Delta n \Lambda \quad (3)$$

where

PMD is the polarization mode dispersion;

CD is the chromatic dispersion;

$\Delta n$ is the effective group index difference; and $\Lambda$ is the grating period.

For nonlinearly chirped fiber Bragg gratings, which have an associated nonlinear group delay as a function of wavelength, the local slope of the chromatic dispersion replaces the quantity CD in equation (2) and equation (3).

The magnitude of polarization mode dispersion in linearly chirped fiber Bragg gratings reportedly ranges between about 0.25 picoseconds and about 8 picoseconds. Polarization mode dispersion compensation requirements for optical communication systems may be less than 1 picosecond.

FIG. 1 shows one proposed approach to polarization mode dispersion compensation for a single linearly chirped fiber Bragg grating. The approach uses a 3-port optical circulator 10. An optical circulator is a non-reciprocating device that transports an optical signal from one port to the next port, only one direction (i.e. 1 to 2, or 2 to 3). They are used to separate forward and backward propagating signals.

An optical signal is received by the first port 12 of the optical circulator 10. The optical circulator 10 directs the optical signal received by the first port 12 to the optical circulator's 10 second port 14. The optical signal propagates toward a fiber Bragg grating 16. The fiber Bragg grating 16 reflects at least a portion of the optical signal back into the second port 14. The optical circulator 10 directs the reflected optical signal to the third port 18 of the optical circulator 10. The optical signal exits the third port 18 of the optical circulator 10 and is directed through a $\lambda/2$ waveplate 20 before entering a polarization maintaining fiber 22. The polarization maintaining fiber 22 is connected to a transmission optical waveguide fiber 24. The $\lambda/2$ waveplate 20 in combination with the polarization maintaining fiber 22 compensate for the polarization mode dispersion in the single grating 16.

FIG. 2 shows another proposed approach to polarization mode dispersion compensation for a single linearly chirped fiber Bragg grating. This approach also uses a three port optical circulator 10. An optical signal is received by the first port 12 of the optical circulator 10. The optical circulator 10 directs the optical signal received by the first port 12 to the optical circulator's 10 second port 14. One end of a polarization maintaining fiber 22 is optically coupled to the second port 14. The other end of the polarization maintaining fiber 22 is optically coupled to a fiber Bragg grating 16.

The optical signal propagates through the polarization maintaining fiber 22 before at least a portion of the optical signal is reflected by the fiber Bragg grating 16. The reflected optical signal propagates back through the polarization maintaining fiber 22 and is introduced into the second port 14 of the optical circulator 10. The optical circulator 10 directs the reflected optical signal out of the third port 18. Typically, the third port 18 is optically coupled to an optical waveguide fiber 24.

Pulse broadening induced by polarization mode dispersion is important in chirped Bragg gratings used as chromatic dispersion compensators in optical communication systems, and has been found to be of particular importance in high speed optical communication systems.

SUMMARY OF THE INVENTION

One aspect of the invention is a chromatic dispersion compensator. The chromatic dispersion compensator includes a first optical circulator. The first optical circulator has a first optical port; a second optical port; and a third optical port. The chromatic dispersion compensator further includes a first grating coupled to the second optical port. A polarization controller is coupled to the third optical port. The chromatic dispersion compensator further includes a second optical circulator. The second optical circulator has a fourth optical port coupled to the polarization controller; a fifth optical port; and a sixth optical port. The chromatic dispersion compensator also includes a second grating coupled to the fifth optical port.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
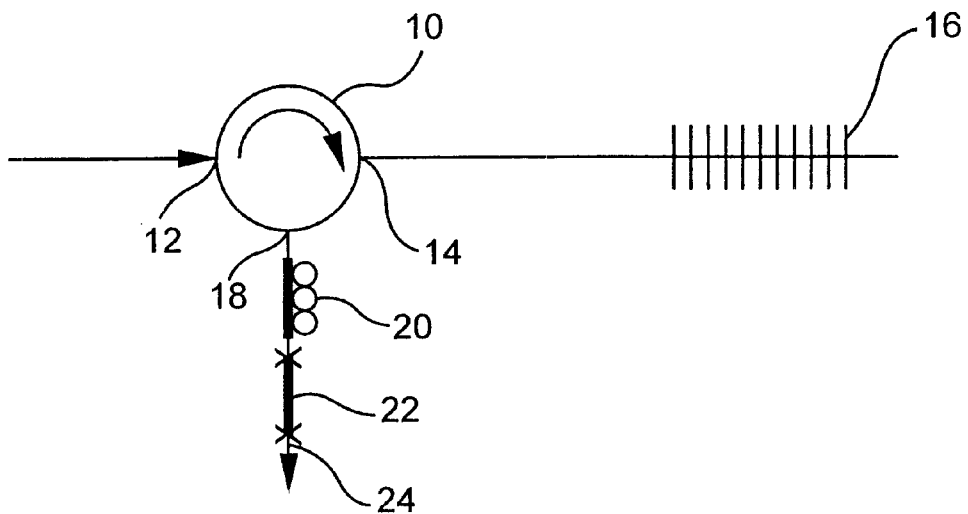
FIG. 1 is a schematic diagram of a prior art chromatic dispersion compensating device.
Figure 2:
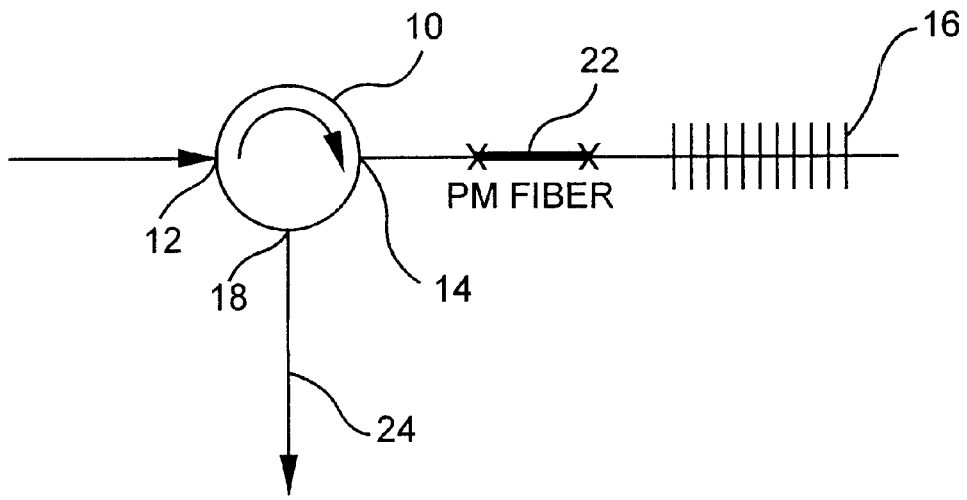
FIG. 2 is a schematic diagram of a prior art chromatic dispersion compensating device.

Reference will now be made in detail to the present preferred embodiments of the invention, an example of which is illustrated in the accompanying drawings. Whenever possible, the same reference numeral will be used throughout the drawings to refer to the same or like parts. An embodiment of the chromatic dispersion compensator of the present invention is shown in FIG. 3, and is designated generally throughout by the reference numeral 26.

Figure 3:
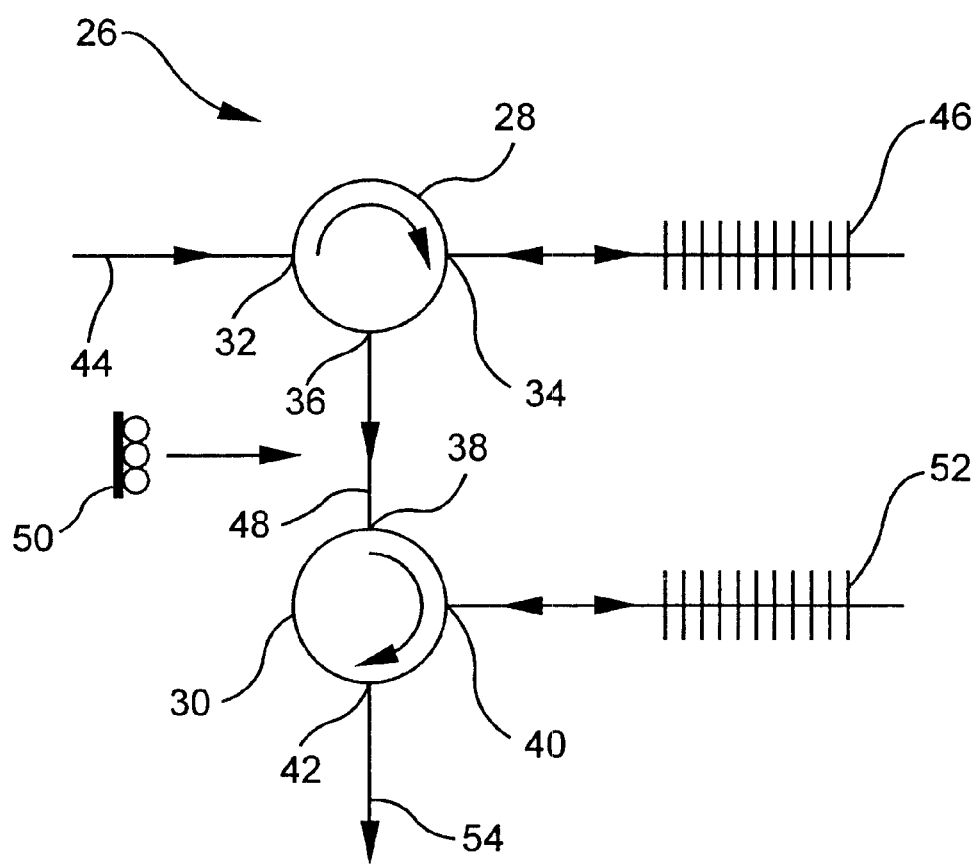
FIG. 3 is a schematic diagram of a chromatic dispersion compensator.

As embodied herein and depicted in FIG. 3, the chromatic dispersion compensator 26 of the present invention includes a first optical circulator 28 and a second optical circulator 30. The first optical circulator 28 includes three ports 32, 34, 36. The second optical circulator 30 also includes three ports 38, 40, 42. Three port optical circulators are available commercially, such as, for example the 3-port optical circulators sold by New Focus, Inc. of San Jose, Calif.

The first port 32 of the first optical circulator 28 is optically coupled to an optical waveguide 44. The optical waveguide 44 may be an optical waveguide fiber or a lightwave optical circuit. The first port 32 receives an optical signal from the optical waveguide 44. The optical signal is made up of light having multiple wavelengths. The first optical circulator 28 directs the optical signal to its second port 34. The second port 34 of the optical circulator 28 is coupled to a first grating 46, such as, for example, a nonlinearly chirped fiber Bragg grating. At least a portion of the optical signal is reflected back into the second port 34 by the grating 46. The first optical circulator 28 directs the reflected optical signal from the second port 34 to the third port 36. The third port 36 of the first optical circulator 28 is optically coupled to the first port 38 of the second optical circulator 30. This optical coupling may be accomplished using an optical waveguide 48. A polarization controller 50 is disposed to act on an optical signal traveling from the third port 36 of the first optical circulator 28 to the first port 38 of the second optical circulator 30. The polarization controller 50 acts on the optical signal in such a manner so as to make the principle states of polarization of the first and second gratings 46, 42 appear orthogonal to one anther. In this way the polarization mode dispersion of the second grating 52 cancels out the polarization mode dispersion of the first grating 46. The polarization controller 50 may be, for example, an in-line polarization controller available from FiberPro of South Korea, or a miniature polarization controller available from Taliescent of Tucson, Ariz.

In an alternative embodiment of the present invention, the waveguide 48 coupling the third port 36 of the first optical circulator 28 to the first port 38 of the second optical circulator 30 is made up of two optical waveguide fibers. The two optical waveguide fibers are typically the optical fiber pigtails of the first and second optical circulators 28, 30. The polarization state of the optical signal is modified by, aligning the pigtails and rotating them about their respective optical axes relative to one another until the principle states of polarization of the first and second gratings 46, 52 appear orthogonal to one another to the optical signal.

In an alternative embodiment of the present invention, the polarization controler 50 is an active polarization controller, such as, for example a Acrobat™ Series of Polarization Controllers available from Corning Applied Technologies of Woburn, Mass. When the polarization controller 50 is an active polarization controller, the chromatic dispersion compensator 26 of the present invention may also compensate the polarization mode dispersion of the optical signal received by the first port 32 of the first optical circulator 28.

A second grating 52, such as, for example, a nonlinearly chirped fiber Bragg grating is optically coupled to the second port 40 of the second optical circulator 30. The second grating 52 is substantially identical to the first grating 46. The second grating 52 is coupled to the second port 40 such that the orientation of the second grating 52 is reversed with respect to the second port 40 from the orientation of the first grating 46 with respect to the second port 34 of the first optical circulator 28. That is to say, as seen by an optical signal, the variation in Bragg wavelength as a function of length along the grating of the second grating 52 is substantially inverse to the variation in Bragg wavelength as a function of length along the grating of the first grating 46. The second grating 52 reflects the optical signal previously reflected by the first grating 46. This second reflection completes the chromatic dispersion compensation of the reflected optical signal. The chromatic dispersion compensated optical signal re-enters the second circulator 30 through the second port 40. The reflected optical signal is directed to the third port 42 from which it exits the second optical circulator 30. The third port 42 of the second optical circulator 30 is optically coupled to an optical waveguide 54. The chromatic dispersion compensated optical signal propagates along the optical waveguide 54 to its destination.

In an alternative embodiment of the present invention illustrated in FIG. 3, the first and second gratings 46, 52 may be tunable gratings, such as, for example thermally tunable, non-linearly chirped fiber Bragg gratings. The first and second gratings 46, 52 may have either linear or nonlinear dispersion compensation slopes. Typically, the gratings 46, 52 have an operational optical bandwidth of about 2 nanometers of which only about 0.5 nanometers is used. By only using a portion of the potential operational bandwidth of the gratings 46, 52 the center wavelength of the gratings 46, 52 may be adjusted to precisely match that of the optical signal that the chromatic dispersion compensator 26 is modifying.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A chromatic dispersion compensator comprising:
   a first optical circulator, said first optical circulator having;
      a first optical port;
      a second optical port; and
      a third optical port
   a polarization controller coupled to said third optical port;
   a second optical circulator, said second optical circulator having;
      a fourth optical port coupled to said polarization controller;
      a fifth optical port; and
      a six optical port;
   a first grating coupled to said second optical port; and
   a second grating coupled to said fifth optical port.

2. The chromatic dispersion compensator of claim 1 wherein said first grating and said second grating are fiber Bragg gratings.

3. The chromatic dispersion compensator of claim 1 wherein said first grating and said second grating are non-linearly chirped fiber Bragg gratings.

4. The chromatic dispersion compensator of claim 3 wherein the variation of Bragg wavelength as a function of length of said second grating is substantially inverse to the variation of Bragg wavelength as a function of length of said first grating.

5. The chromatic dispersion compensator of claim 4 wherein said polarization controller comprises two optical waveguide fibers rotationally aligned one to another so that the principle states of polarization of said first grating and said second grating appear orthogonal to one another to an optical signal reflected acted upon by the chromatic dispersion compensator.

6. The chromatic dispersion compensator of claim 1 wherein said polarization controller is a dynamic polarization controller.

7. The chromatic dispersion compensator of claim 1 wherein said first and second gratings are tunable gratings.

8. chromatic dispersion compensator of claim 1 wherein said polarization controller is a dynamic polarization controller; and wherein said first and second gratings are tunable gratings.

9. An optical communication system comprising:
   a chromatic dispersion compensator, said chromatic dispersion compensator including:
      a first optical circulator, said first optical circulator having;
         a first optical port;
         a second optical port; and
         a third optical port
      a polarization controller coupled to said third optical port;
      a second optical circulator, said second optical circulator having;
         a fourth optical port coupled to said polarization controller;
         a fifth optical port; and
         a six optical port;
      a first grating coupled to said second optical port; and
      a second grating coupled to said fifth optical port.

10. A chromatic dispersion compensator comprising:
    a first optical circulator, said first optical circulator having;
       a first optical port;
       a second optical port; and
       a third optical port
    a first grating coupled to said second optical port;
    a second optical circulator, said second optical circulator having;
       a fourth optical port coupled to said third optical port;
       a fifth optical port; and
       a six optical port;
    a second grating coupled to said fifth optical port; and
    a polarization controller disposed to alter the polarization state of an optical signal propagating from said third optical port to said fourth optical port.

11. The chromatic dispersion compensator of claim 10 wherein said first grating and said second grating are fiber Bragg gratings.

12. The chromatic dispersion compensator of claim 10 wherein said first grating and said second grating are non-linearly chirped fiber Bragg gratings.

13. The chromatic dispersion compensator of claim 12 wherein the variation of Bragg wavelength as a function of length of said first grating and said second grating are substantially identical.

14. The chromatic dispersion compensator of claim 13 wherein said polarization controller comprises two optical waveguide fibers rotationally aligned one to another so that the principle states of polarization of said first grating and said second grating appear orthogonal to one another to an optical signal reflected acted upon by the chromatic dispersion compensator.

15. The chromatic dispersion compensator of claim 10 wherein said polarization controller is a dynamic polarization controller.

16. The chromatic dispersion compensator of claim 10 wherein said first and second gratings are tunable gratings.

17. chromatic dispersion compensator of claim 10 wherein said polarization controller is a dynamic polarization controller; and wherein said first and second gratings are tunable gratings.

* * * * *